No. 816,611. PATENTED APR. 3, 1906.
R. SIEGFRIED.
FLEXIBLE CONNECTION AND SUSPENSION DEVICE FOR GEARLESS MOTORS.
APPLICATION FILED MAY 22, 1905.

2 SHEETS—SHEET 1.

WITNESSES:
C. L. Belcher
Otto S. Schairer

INVENTOR
Robert Siegfried
BY
Stanley G. Carr
ATTORNEY

No. 816,611. PATENTED APR. 3, 1906.
R. SIEGFRIED.
FLEXIBLE CONNECTION AND SUSPENSION DEVICE FOR GEARLESS MOTORS.
APPLICATION FILED MAY 22, 1905.

WITNESSES:
C. L. Belcher
Otto S. Schairer

INVENTOR
Robert Siegfried
BY
Keley S. Carr
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

FLEXIBLE CONNECTION AND SUSPENSION DEVICE FOR GEARLESS MOTORS.

No. 816,611.     Specification of Letters Patent.     Patented April 3, 1906.

Application filed May 22, 1905. Serial No. 261,673.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Flexible Connection and Suspension Devices for Gearless Motors, of which the following is a specification.

My invention relates to electrically-propelled vehicles, and particularly to means for operatively connecting the armatures of gearless motors to the truck-wheels of such vehicles.

The object of my invention is to provide a simple, inexpensive, and durable means for connecting a motor-armature to a truck-wheel without the interposition of speed-reducing gearing.

Figure 1:
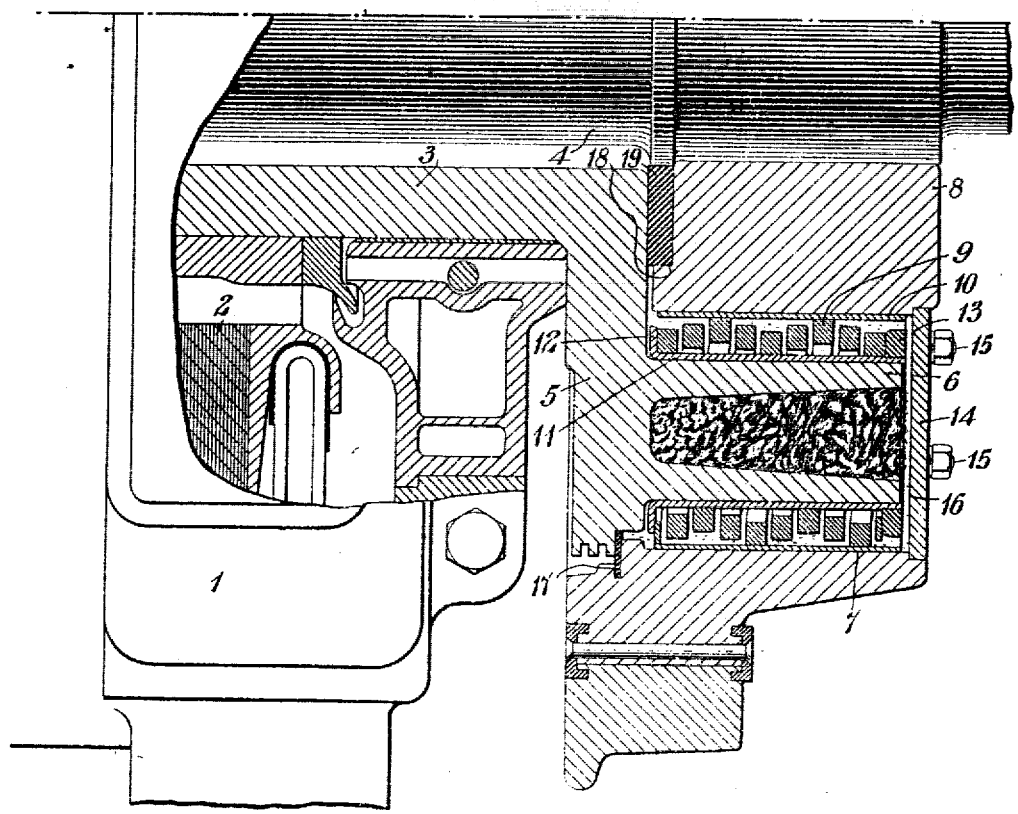
Figure 2:
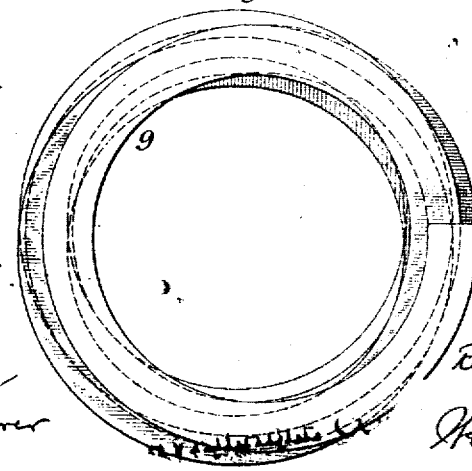
Figure 3:
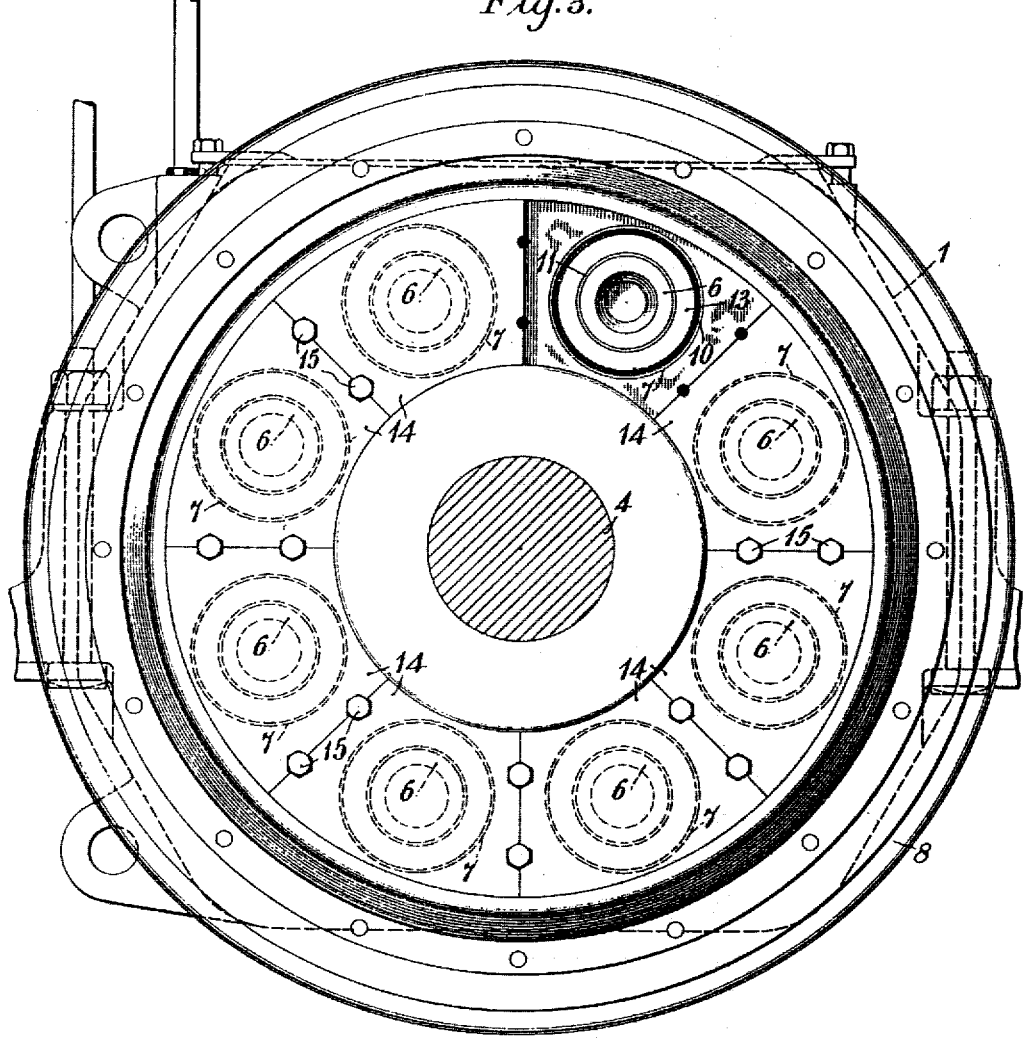

In the accompanying drawings, Figure 1 is a plan view, partially in section, of a portion of a motor and the corresponding portion of a truck-wheel. Fig. 2 is an end elevation of one of the helical springs utilized in the structure shown in Fig. 1; and Fig. 3 is an end elevation of a truck-wheel shown in Fig. 1, one of the cover-plates being removed.

While it is the general practice to connect motor-armatures to truck-axles by means of speed-reducing gearing, various expedients have been devised and tried for utilizing slow-speed motors to drive vehicles without the use of speed-reducing gearing. Such expedients have not generally been successful on account of failure to provide or employ satisfactory means for so supporting the motor-armatures as to avoid injury from the shocks to which the truck-axles have been subjected in operation. The means which I have shown in the accompanying drawings and which I will now describe provides a uniformly-distributed cushion for supporting the armature in all of its positions and one which is simple in construction, easily manufactured and applied, and durable in use.

The field-magnet frame 1 of the motor may be suspended from the truck-frame in any suitable manner and by any proper means, and the armature 2 of the motor may be rigidly mounted upon a quill or sleeve 3, that surrounds but is out of contact with the truck-axle 4. The quill or sleeve 3 is provided with either a laterally-projecting flange 5 or arms, whichever may be found more convenient or desirable, and projecting from the flange or from the arms, as the case may be, is a plurality of hollow bosses 6, which are preferably cylindrical in contour and may be of any suitable number, eight such bosses being shown in the drawings. These bosses project into corresponding chambers 7 in the truck-wheel 8, which are of sufficiently greater diameter to receive a cushioning-spring 9, an outer bearing-shell 10, and an inner shell 11, having at its inner end a lateral flange 12 and at its outer end a holding-ring 13, that is screwed upon the end of the shell. The outer end of each of the chambers 7 may be closed by means of a plate 14, which may be held in position by means of bolts or screws 15.

Located in the space between the shells 10 and 11 is the helical spring 9, which is of special construction to adapt it to the present service, as will appear by reference to Figs. 1 and 2. Each turn of the helix is offset from the adjacent turns, so that no one of the turns engages either the inner shell or the outer shell for any considerable portion of its length and no two adjacent turns engage either the outer or the inner shell at corresponding points or portions. The relation between each boss, the corresponding chamber, and the spring is therefore such that a considerable resistance is exerted by it, and yet it yields sufficiently to afford the desired cushioning effect and to perform its other functions in a very desirable manner.

In order to properly lubricate the springs, I may fill the cavity in each of the bosses 6 with cotton or wool waste 16 and add sufficient oil to the waste so that the desired amount will leak into the surrounding space occupied by the spring. Leakage of oil from the spring-chamber is prevented by a packing-ring 17, formed of felt or other suitable material.

Located in an annular recess 18 in the inner face of the wheel and projecting beyond the outermost portion of the face is a ring 19, formed of soft rubber or other suitable yielding resilient material, to receive the end thrust of the quill 3 and the armature 2.

I desire it to be understood that all variations in form, dimensions, and relations of parts that do not change the mode of operation or result are within the scope of my invention.

I claim as my invention—

1. The combination with a truck-axle and a wheel therefor, provided with a cylindrical chamber, the axis of which is substantially parallel to the axis of the wheel, of a motor-armature having a quill or sleeve provided with a boss that projects into the wheel-chamber, and compressible, resilient means interposed between the bosses and the circumferential wall of its chamber.

2. The combination with a truck-axle and a wheel therefor, provided with a set of cylindrical chambers, the axes of which are substantially parallel to the wheel-axis, of a quill or sleeve provided with a set of cylindrical bosses at one end that project into the wheel-chambers, and a resilient, cushioning means interposed between each boss and the surrounding wall of its chamber.

3. The combination with a truck-axle and a wheel therefor, provided with a set of chambers, of a quill or sleeve loosely surrounding the axle and provided with bosses that project from one end into the corresponding wheel-chambers, and a helical spring interposed between each of the bosses and the surrounding wall of its chamber.

4. The combination with a truck-axle and a wheel therefor, provided with a cylindrical chamber, of a quill or sleeve loosely surrounding the axle and provided with a cylindrical boss that projects into the wheel-chamber, and a helical spring surrounding the boss, each turn of which is offset from the adjacent turns so that no two adjacent turns make either internal or external contact at corresponding points.

5. The combination with a truck-axle and a wheel therefor, having a set of cylindrical chambers, of a motor-armature, a sleeve or quill therefor, that loosely surrounds the axle, and is provided with a set of bosses that project into the wheel-chambers, a helical spring surrounding each of the bosses, each turn of which is offset from the adjacent turns so that no two adjacent turns make either internal or external contact at corresponding points, and means for retaining each spring in position on the corresponding boss.

6. The combination with a truck-axle and a wheel therefor, having a cylindrical chamber, of a motor-armature having a sleeve or quill loosely surrounding the axle, and provided with a hollow cylindrical boss that projects into the wheel-chamber, a helical spring that surrounds the said boss and is so formed that each turn of the helix is offset from the adjacent turns, and means within the hollow bosses for lubricating the springs.

7. The combination with a truck-axle and a wheel therefor, having a plurality of cylindrical chambers, the axes of which are substantially parallel to the wheel-axis, of a sleeve or quill loosely surrounding the axle, and provided with hollow cylindrical bosses that project into the wheel-chambers, helical springs surrounding the respective bosses, each turn of each of which is offset from the adjacent turns so that each of the turns is eccentric with reference to the others, and means located within each boss for providing lubricating material to the corresponding spring.

8. The combination with a truck-axle, and a wheel therefor, having a plurality of cylindrical chambers, of a quill or sleeve having a plurality of bosses that severally project into said chambers and a plurality of helical springs severally surrounding the bosses within the chambers and each having a plurality of consecutive turns each of which is eccentric with reference to the others, so that no two of the said consecutive turns engage either the chamber or the boss at corresponding points.

9. The combination with a wheel having one or more chambers offset from its axis and a driving member, the axis of which is normally coincident with that of the wheel and having one or more bosses that project into said chamber or chambers, of a helical spring surrounding said boss or each of them, each convolution of which is eccentric to adjacent convolutions.

10. The combination with a member having a cylindrical chamber and another member having a boss that projects into the chamber, of a helical spring surrounding the boss and interposed between the boss and the walls of the chamber, the spring being formed so that no two adjacent convolutions normally engage either the boss or the chamber-walls on a line parallel with the axis of the boss.

11. The combination with two rotatable members having normally coincident axes, one of said members having one or more chambers and the other having one or more corresponding bosses that project into said chamber or chambers, of a helical spring surrounding said boss or each of them, each convolution of which is eccentric with reference to adjacent convolutions.

12. The combination with a truck-wheel and its axle, of a motor-armature, a quill therefor that loosely surrounds the axle, yielding connections between the quill and the truck-wheel and a cushioning-ring interposed between the end of the quill and the truck-wheel.

13. The combination with a truck-axle and a wheel therefor, provided with a chamber, of a motor-armature having a quill or sleeve provided with a boss that projects into the wheel-chamber, and a compressible, resilient means that surrounds the boss within the chamber.

14. The combination with a truck-axle and a wheel therefor, provided with a set of chambers, of a quill or sleeve provided with a set of bosses at one end that project into the wheel-chambers, and a resilient cushioning means that surrounds each boss within its chamber.

15. The combination with a truck-axle and a wheel therefor, provided with a chamber, of a quill or sleeve loosely surrounding the axle and provided with a boss that projects into the wheel-chamber, and a helical spring surrounding the boss, each turn of which is offset from the adjacent turns so that no two adjacent turns make either internal or external contact at corresponding points.

16. The combination with a truck-axle and a wheel therefor, having a set of chambers, of a motor-armature, a sleeve or quill therefor, that loosely surrounds the axle, and is provided with a set of bosses that project into the wheel-chambers, a helical spring surrounding each of the bosses, each turn of which is offset from the adjacent turns so that no two adjacent turns make either internal or external contact at corresponding points, and means for retaining each spring in position on the corresponding boss.

17. The combination with a truck-axle and a wheel therefor, having a chamber, of a motor-armature having a sleeve or quill loosely surrounding the axle, and provided with a hollow boss that projects into the wheel-chamber, a helical spring that surrounds the said boss and is so formed that each turn of the helix is offset from the adjacent turns, and means within the hollow bosses for lubricating the springs.

18. The combination with a truck-axle and a wheel therefor, having a plurality of chambers, the axes of which are substantially parallel to the wheel-axis, of a sleeve or quill loosely surrounding the axle, and provided with hollow bosses that project into the wheel-chambers, helical springs surrounding the respective bosses, each turn of each of which is offset from the adjacent turns so that each of the turns is eccentric with reference to the others, and means located within each boss for providing lubricating material to the corresponding spring.

19. The combination with a truck-axle, and a wheel therefor, having a plurality of chambers, of a quill or sleeve having a plurality of bosses that severally project into said chambers and a plurality of helical springs severally surrounding the bosses within the chambers and each having a plurality of consecutive turns each of which is eccentric with reference to the others, so that no two of the said consecutive turns engage either the chamber or the boss.

20. The combination with a wheel having one or more chambers offset from its axis and a driving member, the axis of which is normally coincident with that of the wheel, and having one or more bosses that project into said chamber or chambers, of a resilient cushion surrounding said boss, or each of them.

21. The combination with a member having a chamber and another member having a boss that projects into the chamber, of a helical spring surrounding the boss and interposed between the boss and the walls of the chamber, the spring being formed so that no two adjacent convolutions normally engage either the boss or the chamber-walls on a line parallel with the axis of the boss.

22. The combination with two rotatable members having normally coincident axes, one of said members having one or more chambers and the other having one or more corresponding bosses that project into said chamber or chambers, of a resilient cushion surrounding said boss, or each of them.

In testimony whereof I have hereunto subscribed my name this 20th day of May, 1905.

ROBERT SIEGFRIED.

Witnesses:
B. M. WILLIAMS,
BIRNEY HINES.